United States Patent
Basak et al.

(10) Patent No.: US 8,983,969 B2
(45) Date of Patent: Mar. 17, 2015

(54) DYNAMICALLY COMPILING A LIST OF SOLUTION DOCUMENTS FOR INFORMATION TECHNOLOGY QUERIES

(75) Inventors: Jayanta Basak, New Delhi (IN); Dinesh Garg, Beawar (IN)

(73) Assignee: International Business Machines Corporation, Armonk, NY (US)

( * ) Notice: Subject to any disclaimer, the term of this patent is extended or adjusted under 35 U.S.C. 154(b) by 798 days.

(21) Appl. No.: 12/504,091

(22) Filed: Jul. 16, 2009

(65) Prior Publication Data
US 2011/0016081 A1 Jan. 20, 2011

(51) Int. Cl.
G06F 7/00 (2006.01)
G06F 17/30 (2006.01)

(52) U.S. Cl.
CPC .............................. *G06F 17/30424* (2013.01)
USPC ............ 707/748; 707/749; 707/750; 715/205

(58) Field of Classification Search
None
See application file for complete search history.

(56) References Cited

U.S. PATENT DOCUMENTS

| | | | | |
|---|---|---|---|---|
| 5,404,518 A | * | 4/1995 | Gilbertson et al. | 1/1 |
| 5,634,021 A | * | 5/1997 | Rosenberg et al. | 715/841 |
| 6,321,192 B1 | * | 11/2001 | Houchin et al. | 704/9 |
| 6,424,971 B1 | * | 7/2002 | Kreulen et al. | 707/737 |
| 6,493,703 B1 | * | 12/2002 | Knight et al. | 1/1 |
| 6,778,979 B2 | * | 8/2004 | Grefenstette et al. | 1/1 |
| 6,804,665 B2 | * | 10/2004 | Kreulen et al. | 1/1 |
| 6,820,075 B2 | * | 11/2004 | Shanahan et al. | 715/205 |
| 6,928,425 B2 | * | 8/2005 | Grefenstette et al. | 715/209 |
| 7,117,432 B1 | * | 10/2006 | Shanahan et al. | 715/210 |
| 7,133,862 B2 | * | 11/2006 | Hubert et al. | 1/1 |
| 7,269,545 B2 | | 9/2007 | Agichtein et al. | |
| 7,363,299 B2 | | 4/2008 | Dalvi et al. | |
| 7,647,349 B2 | * | 1/2010 | Hubert et al. | 707/999.107 |
| 7,769,757 B2 | * | 8/2010 | Grefenstette et al. | 707/736 |
| 7,797,303 B2 | * | 9/2010 | Roulland et al. | 707/713 |
| 2002/0123983 A1 | * | 9/2002 | Riley et al. | 707/1 |
| 2007/0073533 A1 | * | 3/2007 | Thione et al. | 704/9 |
| 2008/0016046 A1 | | 1/2008 | Guha | |
| 2008/0109428 A1 | | 5/2008 | Suciu et al. | |
| 2008/0109454 A1 | * | 5/2008 | Willse et al. | 707/100 |

OTHER PUBLICATIONS

Judy C.R. Tseng, "Development of an automatic customer service system on the internet", Electronic commerce research and application 6 (2007) pp. 19-28.*

(Continued)

*Primary Examiner* — Loan T Nguyen
(74) *Attorney, Agent, or Firm* — Ryan, Mason & Lewis, LLP

(57) ABSTRACT

Techniques for dynamically compiling a list of one or more solution documents are provided. The techniques include receiving one or more questions, forming one or more of the one or more questions into one or more lists, wherein forming one or more questions into one or more lists comprises expressing each question in a compressed manner using one or more sets of one or more keywords, receiving input from a solution database, and using the one or more lists and input from a solution database to dynamically compile a list of one or more solution documents in connection with the one or more questions.

19 Claims, 5 Drawing Sheets

(56) References Cited

OTHER PUBLICATIONS

Gwo-Jen Hwang, "an enhanced genetic approach to optimizing auto-reply accuracy of an e-learning system", Computers and Education 51 (2008), pp. 337-353.*

Gwo-Jen Hwang, document tittle "An enhanced genetic approach to optimizing auto-reply accuracy of an e-learning system", dated Jan. 8, 2007.*

* cited by examiner

DYNAMICALLY COMPILING A LIST OF SOLUTION DOCUMENTS FOR INFORMATION TECHNOLOGY QUERIES

FIELD OF THE INVENTION

Embodiments of the invention generally relate to information technology, and, more particularly, to solution retrieval.

BACKGROUND OF THE INVENTION

Users or customers with queries or problems in connection with a product or service can face challenges in attempting to obtain a solution to the query or problem in question. In existing resolution approaches, users must interact with a human representative, who must search through a number of databases for a relevant response, before relaying a response (if found), back to the user. Based on existing approach work flows, inefficiencies are created by the human loop in between the users and the solutions.

Also, approaches such as frequently asked questions (FAQs) mechanisms include the disadvantage of needing to compile a list of the answers for the most frequently asked questions manually. Such a list, consequently, is likely only updated after quite a long period of times.

SUMMARY OF THE INVENTION

Principles and embodiments of the invention provide techniques for automated solution retrieval. An exemplary method (which may be computer-implemented) for dynamically compiling a list of one or more solution documents, according to one aspect of the invention, can include steps of receiving one or more questions, forming one or more of the one or more questions into one or more lists, wherein forming one or more questions into one or more lists comprises expressing each question in a compressed manner using one or more sets of one or more keywords, receiving input from a solution database, and using the one or more lists and input from a solution database to dynamically compile a list of one or more solution documents in connection with the one or more questions.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Principles of the invention include automated and adaptive techniques for dynamically retrieving a given number of documents to answer a maximum number of questions asked by various users over a period of time. One or more embodiments of the invention include dynamically compiling a list of solution documents, answering a maximum number of questions to the best possible extent, in response to a set of questions from different users. Solution documents can be, for example, collected and aggregated over a session where the number of documents are less than or equal to a pre-specified number 'M.'

Additionally, an information retrieval (IR) based system can be used to estimate the quality of the document in response to a given question. Questions asked by a greater number of users are given priority in terms of including its answer document in the final set of M documents. Also, the techniques described herein are automated and can be adapted based on the kinds of questions that are being asked by the users (for example, questions asked in recent times).

One or more embodiments of the invention, for a given constraint in terms of number of solution documents to be shown, and for a given set of questions of any size, include maximizing the coverage of the answer documents so that as many questions are answered as possible. The techniques detailed herein also ensure that more frequently asked questions are answered, and for each question, attempt to provide the best possible answers. Prior documents $P(D_i)$ can be estimated in an iterative manner from session to session based on the kinds of questions that are being asked by the users.

In one or more embodiments of the invention, a human user can simply focus on creating on the answer documents and not on additionally answering the questions. Further, the techniques detailed herein can be implemented, by way of example, for contact centers, help desks, online tutoring systems, etc.

Figure 1:
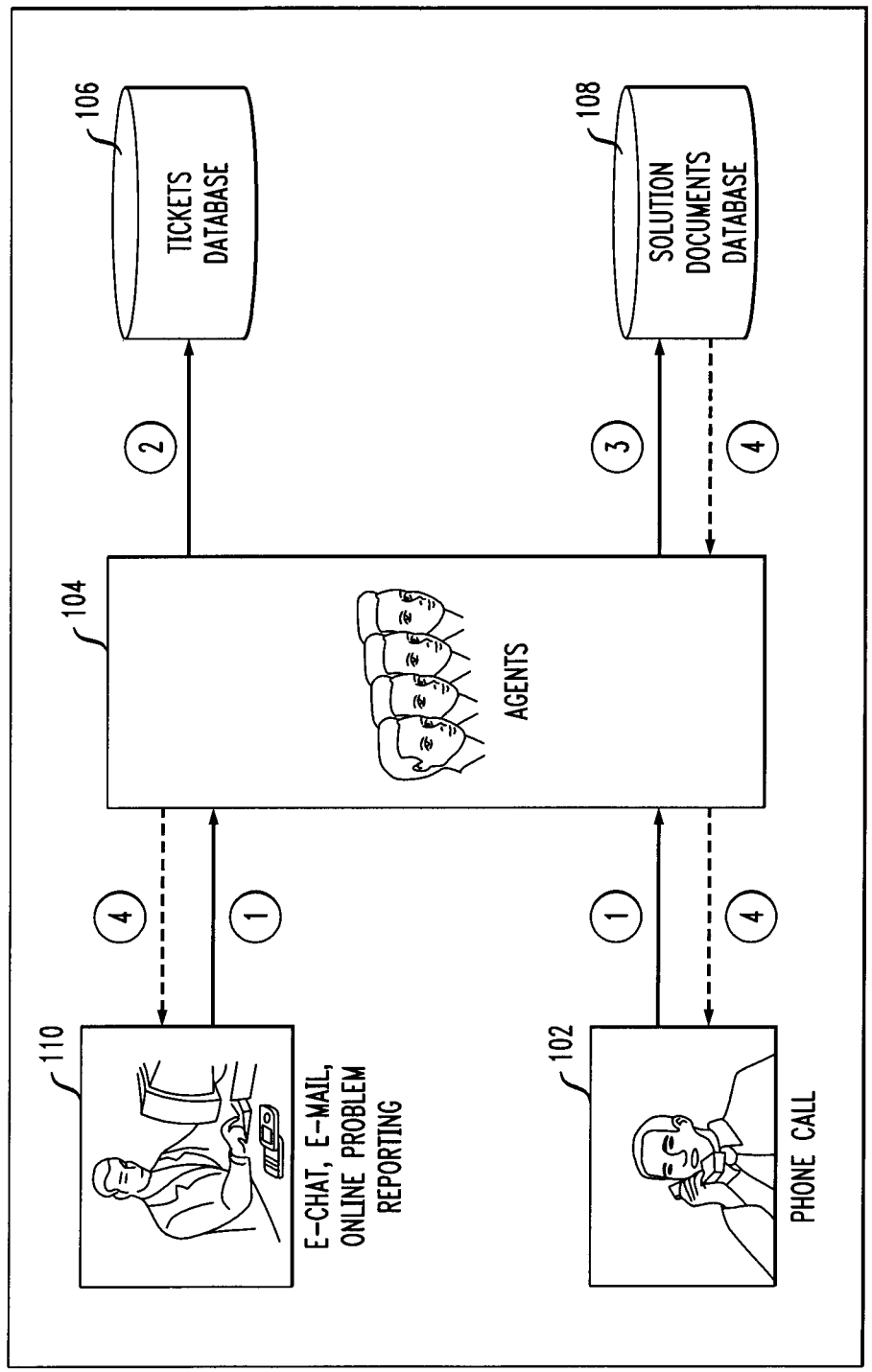
FIG. 1 is a diagram illustrating an existing approach work flow at a contact center.

FIG. 1 is a diagram illustrating an existing approach work flow at a contact center. By way of illustration, FIG. 1 depicts an individual 102 contacting an agent 104, who can access a tickets database 106 as well as a solution documents database 108 in order to solve the individual's query, which the agent can convey to a reporting mechanism 110.

As depicted by FIG. 1, such a process includes four phases. In phase 1 (the contact phase), a user 102 contacts an agent 104 (for example, over a phone call, through the web, chat, mail, online problem reporting, etc.) and reports the problem that she is facing. In phase 2 (the logging phase), the agent logs details of the user and her problem. Such a record can be referred to as a ticket and the corresponding database as a ticket database 106.

In phase 3 (the solution retrieval phase), the agent queries a database, referred to as a solution documents database 108, to search for relevant solution documents. A typical solution document can include, for example, a step-by-step procedure for resolving the problem faced by the user. Further, in phase 4 (the response phase), the agent 104 responds to the user (for example, via a reporting mechanism 110) with a step-by-step procedure for solving her problem. In existing approaches, the agent either uses his previous experience and/or knowledge or refers to an agent facing solution document while responding to the user.

Figure 2:
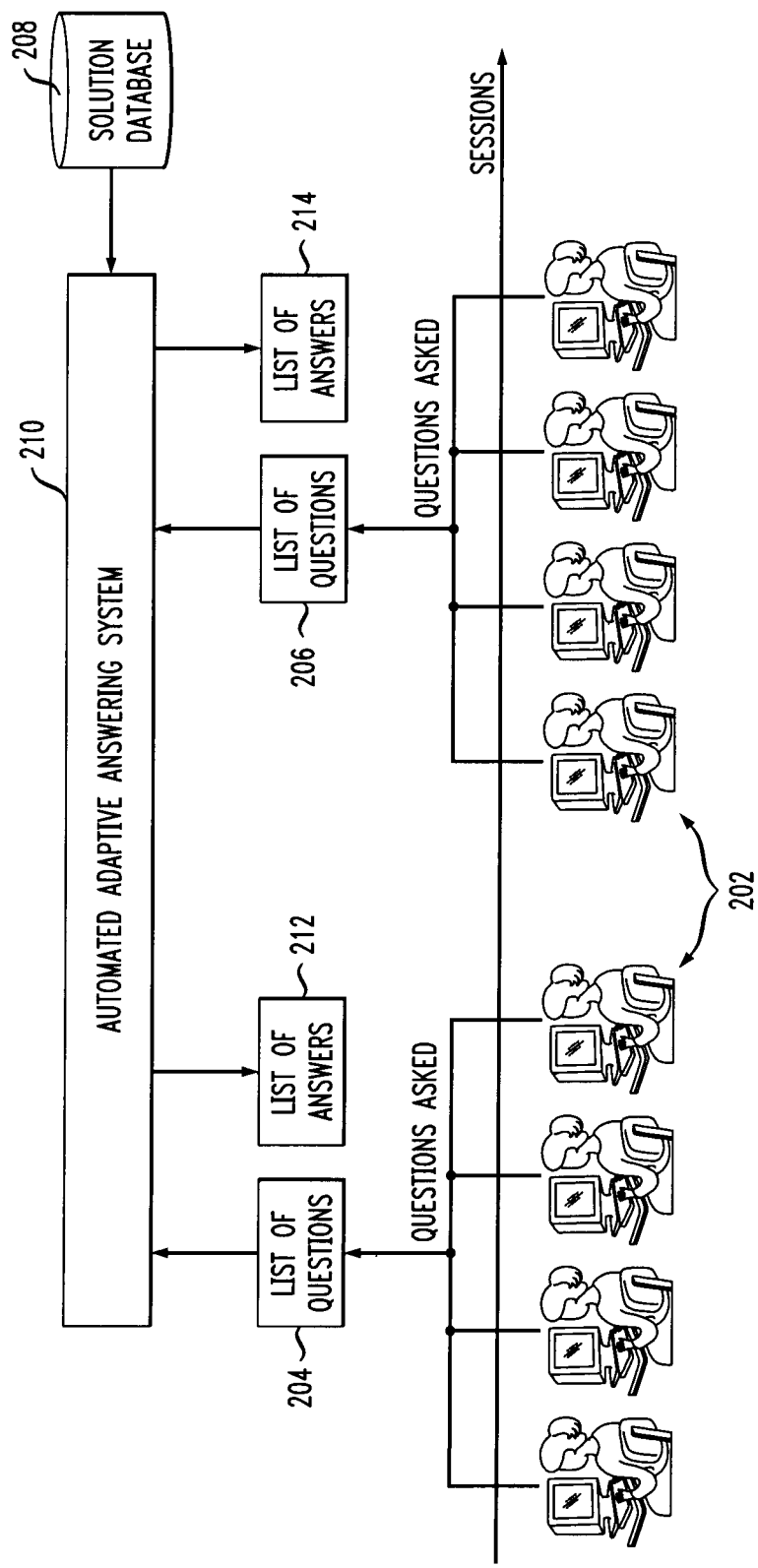
FIG. 2 is a diagram illustrating an automated solution retrieval system, according to an embodiment of the present invention.

FIG. 2 is a diagram illustrating an automated solution retrieval system, according to an embodiment of the present invention. By way of illustration, FIG. 2 depicts questions asked by one or more users 202, those questions being used to form question lists 204 and 206, which are provided (along with input from a solution database 208) to an automated adaptive answering system 210, which can provide answer lists 212 and 214.

As described herein, for a query and/or problem posed by one or more users, there can exist a set of answer (solution documents) already existing in a database (DB). Further, for a question asked by a user, there can be multiple answers with varying degrees of satisfaction in which it answers the given question, and in some instances, there may not exist any answer. A time horizon can be divided into sessions by some criterion and for each session, the objective can be to pull a fixed given number (which can be specified in the beginning of the process) of solution documents in an automated manner such that this set of documents answers as many questions as possible and to the maximum extent of user satisfaction.

One or more embodiments of the invention include preparing a ranked list of solution documents (which can be shown to the users) as a list of top questions, a process that can include the steps of mining and ranking. In the mining step, the ticket logs from ticketing database are mined and statistics that summarize the top questions are prepared. In the ranking step, the summary statistics are utilized to rank a given set of solution documents which can be displayed to the user.

As detailed herein, a ticket is a collection of multiple fields filled by agents. Such fields can include, for example, structured fields (Category1, Category2, . . . , CategoryN) as well as unstructured fields (ProblemSummary, ProblemDetail, RootCauseAnalysisSummary, RootCauseAnalysisDetail, ProblemResolutionSummary, ProblemResolutionDetail).

Figure 3:
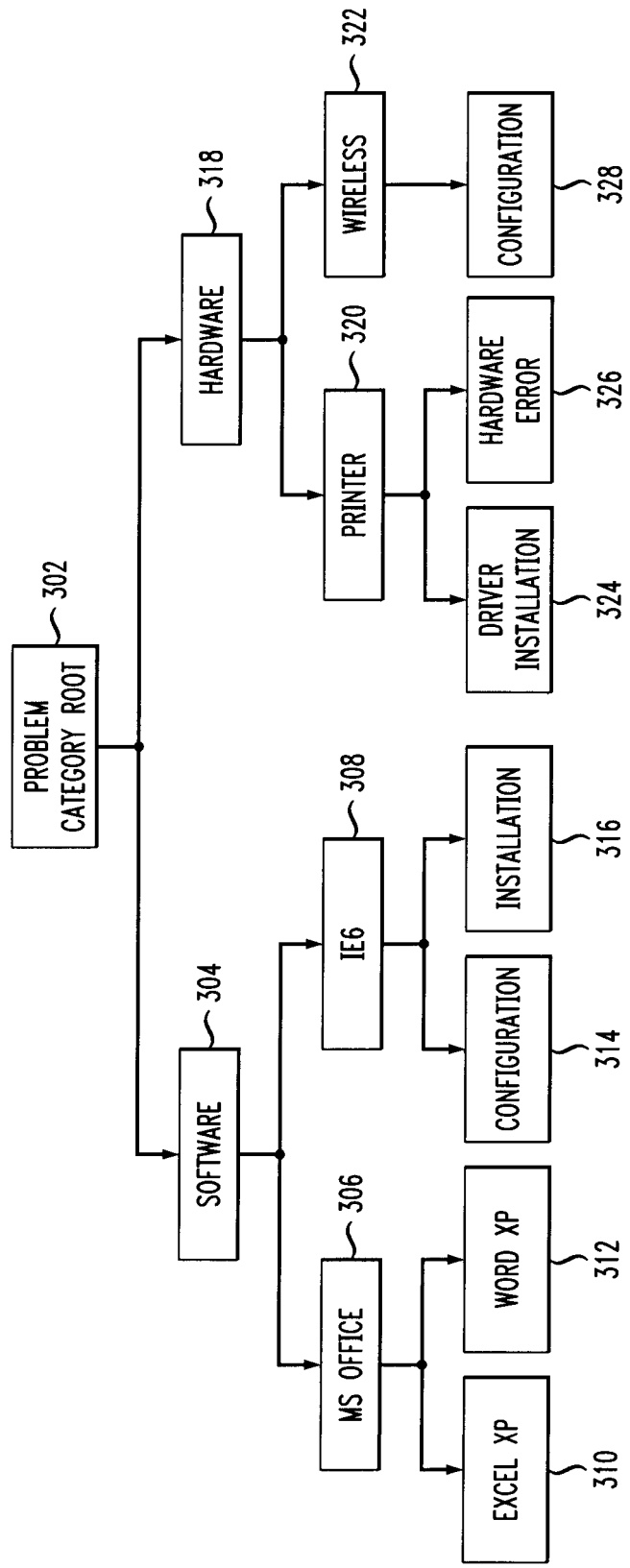
FIG. 3 is a diagram illustrating a sample taxonomy, according to an embodiment of the present invention.

Structured fields capture the class of the problem. By way of example, contact centers can have a pre-defined taxonomy of problems in the form of structured fields. FIG. 3 is a diagram illustrating a sample taxonomy, according to an embodiment of the present invention. By way of illustration, FIG. 3 depicts a problem root category 302, which can be broken down into a software sub-category 304 and a hardware sub-category 318. The software sub-category 304 includes a MS Office branch 306 (which further includes an Excel XP line 310 and a Word XP line 312) and an IE 6 branch 308 (which further includes a configuration line 314 and an installation line 316). The hardware sub-category 318 includes a printer branch 320 (which further includes a driver installation line 324 and a hardware error line 326) and a wireless branch 322 (which further includes a configuration line 328).

As depicted in FIG. 3, category 1 is the highest level classification of problems in the taxonomy, category 2 is the next level of classification in the taxonomy, and so on. For each of these structured category fields, there is a pre-defined set of values and the category field can be assigned a value only from this set. The objective is to select values in such a way that the problem gets mapped to the most representative category. The unstructured fields are filled as free text. These fields capture details of the user problem, the root cause of the problem, and the way in which the problem has been resolved.

In existing approaches, problem categories are usually broad and do not always capture information about specific user problems. There is often a gap between the actual problem and the problem category in the corresponding ticket for the problem. As such, one or more embodiments of the invention utilize the unstructured ticket fields in conjunction with structured fields while preparing a list of top questions. By way of example, the unstructured fields can be utilized to extract a set of representative keywords from unstructured fields of the tickets in that category.

The techniques detailed herein include preparing a single ranked list by utilizing the posterior probabilities of the solution documents. One or more embodiments of the invention use the Bayesian framework where the notion of posterior probability is defined for each solution document. These probability numbers capture the importance of the solution document as far as its membership to the final list of top questions is concerned. Additionally, the techniques described herein compute these numbers and leverage them to prepare the final ranked list.

Figure 4:
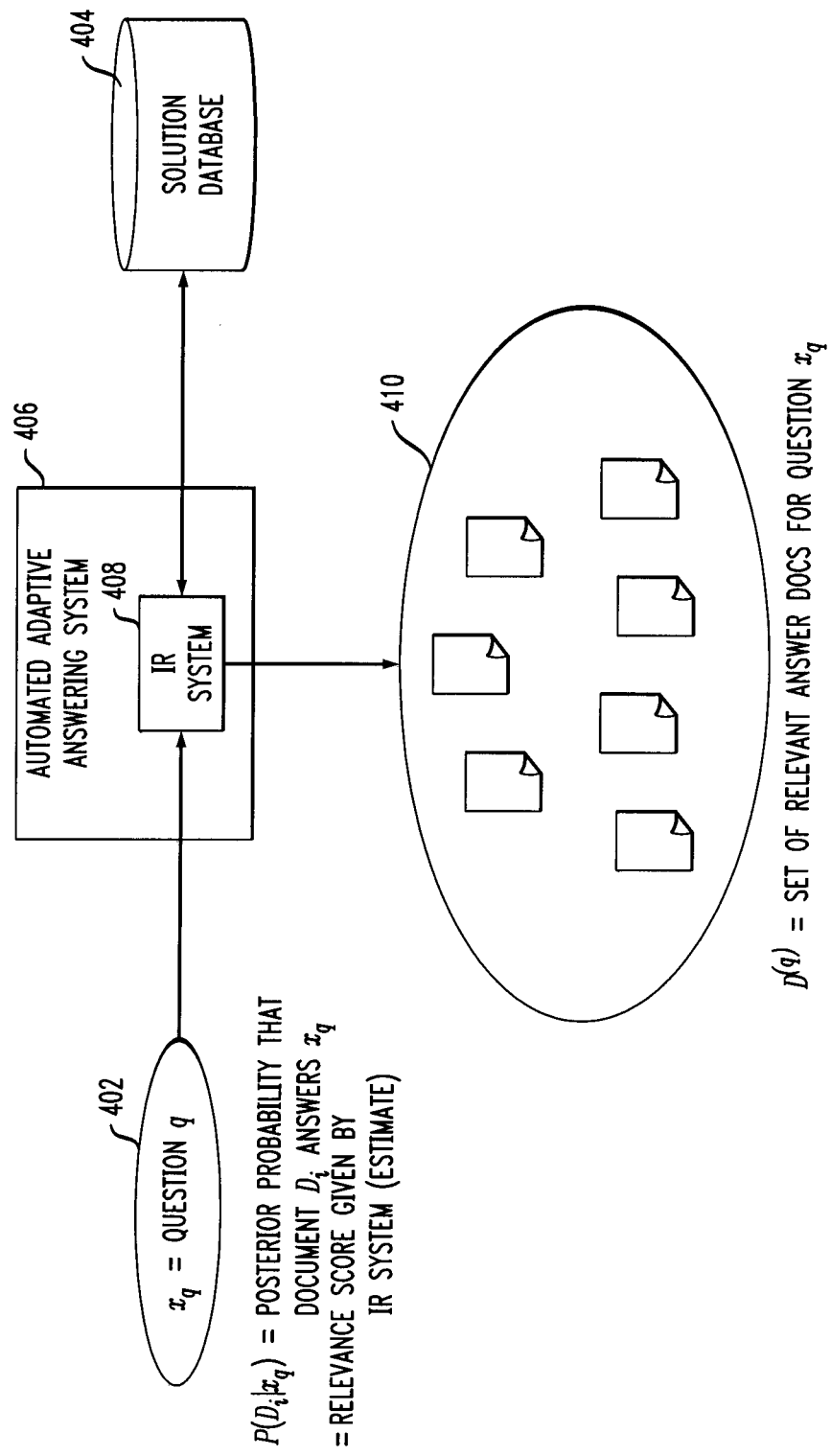
FIG. 4 is a diagram illustrating an automated adaptive answering system, according to an embodiment of the present invention.

FIG. 4 is a diagram illustrating an automated adaptive answering system, according to an embodiment of the present invention. By way of illustration, FIG. 4 depicts a question 402, which is sent to the automated adaptive answering system 406, which includes an IR system 408. The IR system 408 interacts with a solution database 404 and outputs a set of relevant answer documents 410.

The IR system 408 retrieves the answer documents (solution documents) to the questions asked. As described herein, a question is represented by a vector, wherein the vector can be a set of keywords, categories, etc. Depending on the type of question (represented in terms of the vector), a set of solution documents are retrieved by the IR system 408. The IR system ranks the documents with certain scores, and these scores are used as the probabilities in further analysis, as detailed herein.

As detailed herein, each question 1 is represented by a vector $x_l$ such that the complete set of questions is represented as $X=[x_1, x_2, x_3, \ldots, x_n]$ including n questions. For every question, a set of documents are retrieved (for example, using a search engine) such that $D^{(i)}$ represents the set of documents retrieved for question $x_i$. Also, consider the set $\Omega = \cup_i D^{(i)}$ as the universal set of documents for the complete set of questions X. The task is to determine a subset $S \subseteq \Omega$ which best answers the set of questions X subject to $|S| \leq m$, wherein m is a predefined number. In other words, one or more embodiments of the invention can display at most m documents such that all questions are answered to the maximum extent as possible. Further, the techniques described herein obtain the optimal set of documents answering all of the questions satisfactorily such that the aggregated "bestness" is maximized.

As detailed herein, one or more embodiments of the invention define the notion of overall "bestness" in answering all questions and maximize this measure to obtain the optimal subset of documents subject to the constraint $|S| \leq m$. Without loss of generality, a user can represent $\Omega = \{D_1, D_2, \ldots, D_k\}$, where $\Omega$ has k documents, and the document index in the universal set $\Omega$ can be any arbitrary order consistently followed. Let $P(D_i|x_q)$ represent the posterior probability of answering the question $x_q \in X$ through the document $D_i \in \Omega$. One or more embodiments of the invention include obtaining a set of documents for a particular question through a search engine, and the search engine can provide some score in [0, 1] for the document for that particular question. Further, the techniques described herein assume that the posterior $P(D_i|x_q)$ is the same as that score.

Let $n_q$ represent the number of times a question $x_q$ appears. In other words, if a question occurs several times then a user can assume the question to be more important than some other question appearing relatively less number of times. Let D represent a document set answering the question set x. In that case, consider $$P(D \mid x) = \frac{p(x \mid D)P(D)}{p(x)},$$

where P(D) is the prior of the document set D. Assuming the questions to be independent of each other and considering their respective number of occurrences, a user can consider $$P(D \mid x) = \frac{\prod_q p^{n_q}(x_q \mid D)P(D)}{p(x)}.$$

After algebraic manipulation, $$P(D \mid x) = \frac{\prod_q P^{n_q}(D \mid x_q)}{P^{(N-1)}(D)},$$

wherein $$N = \sum_q n_q$$

is the total number of times the questions are asked.

Also, one or more embodiments of the invention include determining one S which maximizes P(S|x). Since D represents the collective set of k distinct documents, a user can consider $$P(D \mid x_q) = P\left(\bigcup_i D_i \mid x_q\right) = 1 - \prod_i (1 - P(D_i \mid x_q))$$

Similarly, for the prior probabilities, a user can expand $$P(D) = 1 - \prod_i (1 - P(D_i)).$$

A user can also represent S by a vector $w=[w_i | i=\{1, 2, \ldots, k\}]$ such that $w_i \in \{0, 1\}$ represents the presence or absence of the document $D_i$ in the set S. Therefore, one or more embodiments of the invention represent $$P(S \mid x_q) = 1 - \prod_i (1 - w_i P(D_i \mid x_q))$$

and

-continued $$P(S) = 1 - \prod_i (1 - w_i P(D_i)).$$

Representing $p_{iq}=P(D_i|x_q)$ and $P_i=P(D_i)$, a user can determine the objective function (the notion of "bestness") P(S|x) as g(w), wherein $$g(w) = \frac{\prod_q \left(1 - \prod_i (1 - w_i p_{iq})\right)^{n_q}}{\left(1 - \prod_i (1 - w_i P_i)\right)^{N-1}}.$$

In one or more embodiments of the invention, assume that $P_i$ is known for all i and the parameters $p_{iq}$ are obtained from the search engine scores. Therefore, the problem is to maximize g(w) subject to the conditions that $$\sum_i w_i \leq m$$

and $$w_i \in \{0, 1\}.$$

This is a complex non-convex optimization task in the discrete space. A user can also deviate from the discrete space and map it onto a continuous space and obtain an iterative algorithm for finding out one local optimal S. Note that, in one or more embodiments of the invention, various techniques can also be obtained for maximizing g(w). Considering w as a continuous variable, a user can obtain the logarithmic loss function as $$E = -\frac{1}{N}\log(g(w)).$$

Since this is in the continuous domain, a user can constrain w by Lagrangian as $$E = -\frac{1}{N}\log(g(w)) + \frac{\lambda}{2}\|w\|^2.$$

By minimizing E, a user can obtain a vector w and rank each $w_i$ according to its value, and select the top m candidates which represent the document subset S. Expanding E, a user can obtain $$E = -\sum_q (n_q/N)\log\left(1 - \prod_i w_i p_{iq}\right) + $$

$$((N-1)/N)\log\left(1 - \prod_i (1 - w_i P_i)\right) + \lambda/2\|w\|^2.$$

One or more embodiments of the invention can obtain a minimum for E by equating the first derivatives to zero and obtaining w. However, the first derivate of E is a highly complex non-linear and it is very difficult to construct a closed-form solution for w. Using steepest gradient descent, a user can obtain $$\Delta w_i = -\eta \frac{\partial E}{\partial w_i},$$

where η is a small constant referred to as the learning rate. Computing the derivative, one or more embodiments of the invention obtain the learning rule as $$\Delta w_i = \eta \left( \sum_q r_q y_q \frac{p_{iq}}{1 - w_i p_{iq}} - (1 - 1/N) Y \frac{P_i}{1 - w_i P_i} - \lambda w_i \right),$$

where $r_q = n_q/N$, $y_q = (1 - P(S | x_q))/P(S | x_q)$, and $Y = (1 - P(S))/P(S)$.

For a large $N$ (which is true in most of the cases), $$\Delta w_i = \eta \left( \sum_q r_q y_q \frac{p_{iq}}{1 - w_i p_{iq}} - Y \frac{P_i}{1 - w_i P_i} - \lambda w_i \right).$$

Additionally, in one or more embodiments of the invention, a user can choose a small η and update w for the matrix $[p_{iq}]$. For some vector w, a user can compute Y and $[y_q]$ for every q and obtain $\Delta w_i$ for each i, and then update w as w=w+Δw. With the new values of w, a user can re-compute Y and $[y_q]$ and follow the same process. Intuitively, the "bestness" will always increase if the size of S is increased. However, the document priors impose an inherent regularization on the measure and restrict the number of documents to grow indefinitely. In addition, one or more embodiments of the invention impose a regularization measured by the squared norm of w subject to a Lagragian multiplier such that the number of desired documents does not grow indefinitely.

From the learning rule, it can be observed that the first part of the right-hand side (RHS) does not contribute to the updating of w for some question q if $P(S|x_q)$ becomes unity. In other words, if the algorithm finds some subset of documents which completely answers a question, then the first part will not contribute in the updating of the vector w. However, there is decay involved in the learning process governed by the second (as derived from the document priors) and third terms of the RHS. As such, if a question is completely explained by a set of documents, then the values of w starts decreasing until the first term again dictates the requirement for increasing the values of w. In this process, the updating of w becomes very small when there is a balance between the first term and the second and third term together. Once the learning (or updating w) is stopped, a user can obtain a vector w from which a user selects the top m entries which represent the desired set of documents. Note that, in the updating, a user does not restrict w to be in the range [0, 1]. Therefore, at every iteration, a user can check each $w_i$ and make it zero if it is less than zero, or make it one if it is greater than unity.

In one or more embodiments of the invention, the prior probabilities are considered to be known. The question is how to obtain the document priors. In this case (unlike the classification), the priors need not sum to unity. Also, a user can consider the prior probability with respect to the final selection of the documents because there is no concept of class here such that the documents can be exclusively assigned to some class. A user can select the document priors to be constant and same for all documents such that every prior is in the range [0, 1] and sum of priors of all documents in the document database is m (that is, the number of documents to be displayed by the system). There are ways to update the document prior over time as and when the system is used. One way to update document prior, for example, includes $P_i=(1-\epsilon)P_i+\epsilon\delta_i$, where ε is a small constant and $\delta_i=1$ is the document selected in a session among the top m documents. Once the $P_i$ is updated for the top m documents, the priors are updated and they are normalized such that the sum of priors of all documents in the database becomes equal to m.

Figure 5:
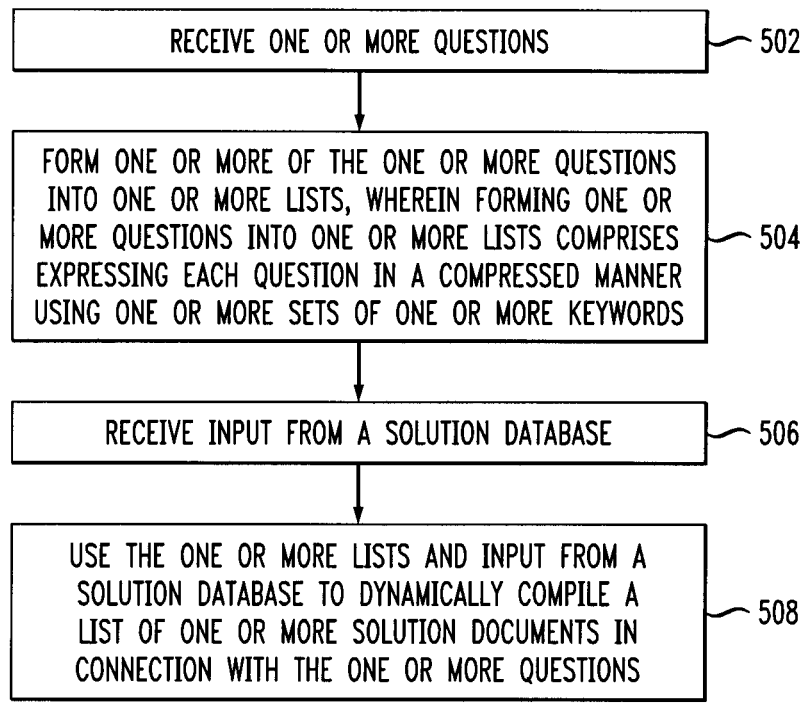
FIG. 5 is a flow diagram illustrating techniques for dynamically compiling a list of one or more solution documents, according to an embodiment of the invention.

FIG. 5 is a flow diagram illustrating techniques for dynamically compiling a list of one or more solution documents, according to an embodiment of the present invention. Step 502 includes receiving one or more questions (for example, from one or more users).

Step 504 includes forming one or more of the one or more questions into one or more lists, wherein forming one or more questions into one or more lists comprises expressing each question in a compressed manner using one or more sets of one or more keywords. The keywords can be derived, for example, from each question itself and/or a repository of keywords. Also, the keywords can include one or more categorical keywords, wherein categorical keywords are derived from matching a given question to a pre-defined taxonomy of the questions. Additionally, the keywords can include one or more descriptive keywords, wherein descriptive keywords are derived from a piece of text of each question itself.

Step 506 includes receiving input from a solution database. Receiving input from a solution database can include receiving a set of solution documents for a particular question through a search engine. The input can additionally include, for example, a list of solution documents and/or any form of information that can be served as answers of the questions. Also, the search engine can provide a score (for example, in [0, 1]) for each document for the particular question.

Step 508 includes using the one or more lists and input from a solution database to dynamically compile a list of one or more solution documents in connection with the one or more questions.

The techniques depicted in FIG. 5 can also include implementing a time horizon, wherein the time horizon is divided into one or more sessions by some criterion. Also, for each session, an objective can include to pull a fixed given number (which can be specified in the beginning of the process) of solution documents in an automated manner (for example, such that the fixed given number of documents answer as many questions as possible and to the maximum extent of user satisfaction).

One or more embodiments of the invention can additionally include preparing a ranked list of solution documents as a list of top questions, wherein preparing the ranked list can include the steps of mining and ranking. The mining step can include mining one or more ticket logs from a ticketing database and preparing statistics that summarize the top questions. The ranking step can include utilizing the summary statistics to rank a given set of one or more solution documents to display to a user.

Further, the techniques depicted in FIG. 5 can include preparing a single ranked list by utilizing posterior probability numbers of each solution document, wherein the probability numbers capture an importance of each solution document as far as its membership to a final list of top questions is concerned.

The techniques depicted in FIG. 5 can also, as described herein, be run on a system, wherein the system includes distinct software modules, each of the distinct software modules being embodied on a tangible computer-readable recordable storage medium. The distinct software modules can include, for example, a solutions database module, an information retrieval system module, and an automated adaptive answering system module executing on a hardware processor.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 6:
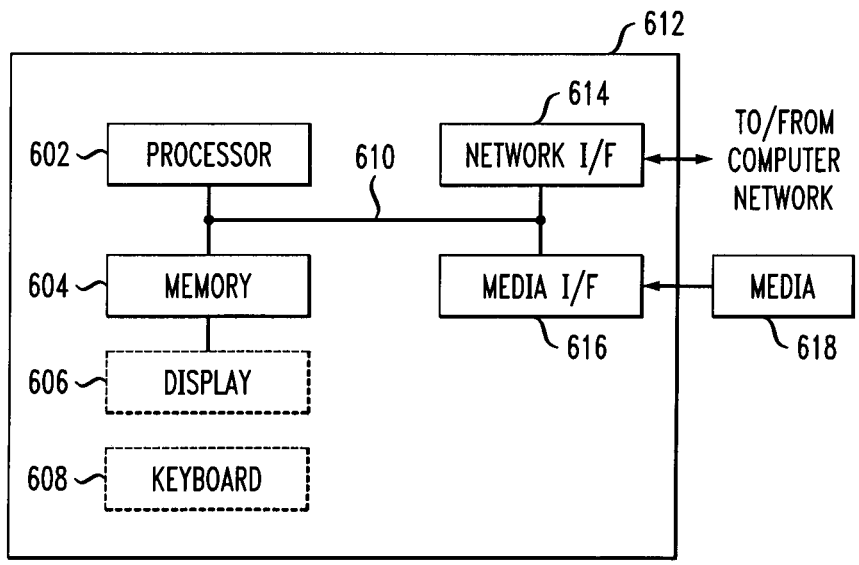
FIG. 6 is a system diagram of an exemplary computer system on which at least one embodiment of the invention can be implemented.

One or more embodiments can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

Furthermore, the invention can take the form of a computer program product accessible from a computer-usable or computer-readable medium (for example, media 618) providing program code for use by or in connection with a computer or any instruction implementation system. For the purposes of this description, a computer usable or computer readable medium can be any apparatus for use by or in connection with the instruction implementation system, apparatus, or device. The medium can store program code to implement one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 604), magnetic tape, a removable computer diskette (for example media 618), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium; the modules can include any or all of the components shown in FIG. 4. The method steps can then be carried out using the distinct software modules and/or sub-modules of the system, as described above, executing on a hardware processor. Further, a computer program product can include a tangible computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, providing an automated approach that can be adapted based on the kinds of questions that are being asked by the users.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for dynamically compiling a list of one or more solution documents, wherein the method comprises:

collecting multiple questions from multiple different users;

forming the multiple questions into one or more lists of questions, wherein forming the multiple questions into one or more lists comprises expressing each question as a set of one or more keywords;

receiving input from a solution database;

automatically using the one or more lists of questions and the input from a solution database to dynamically compile multiple lists of solution documents each consisting of less than or equal to a pre-specified number of solution documents in connection with the multiple questions, said compiling based on structured information pertaining to the multiple questions and the solution database input and on unstructured information comprising the one or more sets of one or more keywords, wherein each list of solution documents is dynamically compiled to include solution documents corresponding to a maximum number of the multiple questions, and wherein solution documents corresponding to questions asked by a greater number of users are automatically prioritized in the list of solution documents;

ranking the multiple lists of solution documents based on multiple parameters comprising multiple posterior probabilities for each list of solution documents and a correspondence of the solution documents to questions asked by a greater number of users, wherein each of the multiple posterior probabilities, P(D|x), represents a probability of answering one of the multiple questions through a given list of solution documents and is calculated as $$P(D|x) = \frac{\prod_q P^{n_q}(D|x_q)}{P^{(N-1)}(D)},$$

wherein D represents the given list of solution documents answering a question set x, $n_q$ represents the number of times a question $x_q$ appears, and $N=\Sigma_q n_q$; and updating each of the multiple posterior probabilities based on said ranking.

2. The method of claim 1, wherein the one or more keywords are derived from at least one of each question itself and a repository of keywords.

3. The method of claim 1, wherein the one or more keywords comprise one or more categorical keywords, wherein categorical keywords are derived from matching a given question to a pre-defined taxonomy of the one or more questions.

4. The method of claim 1, wherein the one or more keywords comprise one or more descriptive keywords, wherein descriptive keywords are derived from a piece of text of each question itself.

5. The method of claim 1, wherein receiving input from a solution database comprises receiving a set of one or more solution documents for a particular question through a search engine.

6. The method of claim 5, wherein the search engine provides a score for each document for the particular question.

7. The method of claim 1, further comprising implementing a time horizon, wherein the time horizon is divided into one or more sessions by specified criterion.

8. The method of claim 7, wherein for each session, an objective comprises to pull a fixed given number of solution documents automatically.

9. The method of claim 1, further comprising preparing a ranked list of one or more solution documents as a list of top questions, wherein preparing the ranked list comprises steps of mining and ranking.

10. The method of claim 9, wherein preparing a ranked list of one or more solution documents as a list of top questions comprises a mining step, wherein the mining step comprises mining one or more ticket logs from a ticketing database and preparing statistics that summarize the top questions.

11. The method of claim 10, wherein preparing a ranked list of one or more solution documents as a list of top questions comprises a ranking step, wherein the ranking step comprises utilizing the summary statistics to rank a given set of one or more solution documents to display to a user.

12. The method of claim 1, wherein the method is run on a system, wherein the system comprises one or more distinct software modules, each of the one or more distinct software modules being embodied on a tangible computer-readable recordable storage medium, and wherein the one or more distinct software modules comprise a solutions database module, an information retrieval system module, and an automated adaptive answering system module executing on a hardware processor.

13. A computer program product comprising a tangible non-transitory computer readable recordable storage medium including computer useable program code for dynamically compiling a list of one or more solution documents, the computer program product including:
   computer useable program code for collecting multiple questions from multiple different users;
   computer useable program code for forming the multiple questions into one or more lists of questions, wherein forming the multiple questions into one or more lists comprises expressing each question as a set of one or more keywords;
   computer useable program code for receiving input from a solution database;
   computer useable program code for automatically using the one or more lists of questions and the input from a solution database to dynamically compile multiple lists of solution documents each consisting of less than or equal to a pre-specified number of solution documents in connection with the multiple questions, said compiling based on structured information pertaining to the multiple questions and the solution database input and on unstructured information comprising the one or more sets of one or more keywords, wherein each list of solution documents is dynamically compiled to include solution documents corresponding to a maximum number of the multiple questions, and wherein solution documents corresponding to questions asked by a greater number of users are automatically prioritized in the list of solution documents;
   computer useable program code for ranking the multiple lists of solution documents based on multiple parameters comprising multiple posterior probabilities for each list of solution documents and a correspondence of the solution documents to questions asked by a greater number of users, wherein each of the multiple posterior probabilities, P(D|x), represents a probability of answering one of the multiple questions through a given list of solution documents and is calculated as $$P(D|x) = \frac{\prod_q P^{n_q}(D|x_q)}{P^{(N-1)}(D)},$$

wherein D represents the given list of solution documents answering a question set x, $n_q$ represents the number of times a question $x_q$ appears, and $N =\Sigma_q n_q$ ; and
   computer useable program code for updating each of the multiple posterior probabilities based on said ranking.

14. The computer program product of claim 13, wherein the one or more keywords comprise at least one of:
   one or more categorical keywords, wherein categorical keywords are derived from matching a given question to a pre-defined taxonomy of the one or more questions; and
   one or more descriptive keywords, wherein descriptive keywords are derived from a piece of text of each question itself.

15. The computer program product of claim 13, further comprising computer useable program code for preparing a ranked list of one or more solution documents as a list of top questions, wherein the computer useable program code for preparing the ranked list comprises computer useable program code for mining and computer useable program code for ranking.

16. The computer program product of claim 13, wherein the computer usable program code comprises one or more distinct software modules, and wherein the one or more distinct software modules comprise a solutions database module, an information retrieval system module, and an automated adaptive answering system module executing on a hardware processor.

17. A system for dynamically compiling a list of one or more solution documents, comprising:
   a memory; and
   at least one processor coupled to the memory and operative to:
   collect multiple questions from multiple different users;
   form the multiple questions into one or more lists of questions, wherein forming the multiple questions into one or more lists comprises expressing each question as a set of one or more keywords;

receive input from a solution database; and automatically use the one or more lists of questions and the input from a solution database to dynamically compile multiple lists of solution documents each consisting of less than or equal to a pre-specified number of solution documents in connection with the multiple questions, said compiling based on structured information pertaining to the multiple questions and the solution database input and on unstructured information comprising the one or more sets of one or more keywords, wherein each list of solution documents is dynamically compiled to include solution documents corresponding to a maximum number of the multiple questions, and wherein solution documents corresponding to questions asked by a greater number of users are automatically prioritized in the list of solution documents;

rank the multiple lists of solution documents based on multiple parameters comprising multiple posterior probabilities for each list of solution documents and a correspondence of the solution documents to questions asked by a greater number of users, wherein each of the multiple posterior probabilities, P(D|x), represents a probability of answering one of the multiple questions through a given list of solution documents and is calculated as $$P(D|x) = \frac{\prod_q P^{n_q}(D|x_q)}{P^{(N-1)}(D)},$$

wherein D represents the given list of solution documents answering a question set x, $n_q$ represents the number of times a question $x_q$ appears, and $N = \Sigma_q n_q$; and update each of the multiple posterior probabilities based on said ranking.

18. The system of claim 17, wherein the one or more keywords comprise at least one of:

one or more categorical keywords, wherein categorical keywords are derived from matching a given question to a pre-defined taxonomy of the one or more questions; and one or more descriptive keywords, wherein descriptive keywords are derived from a piece of text of each question itself.

19. The system of claim 17, further comprising a tangible computer-readable recordable storage medium having one or more distinct software modules embodied thereon, the one or more distinct software modules comprising a solutions database module, an information retrieval system module, and an automated adaptive answering system module executing on a hardware processor.

* * * * *